Nov. 13, 1962
D. G. MORROW
3,063,804
MANUFACTURE OF DINITROGEN TETROXIDE
Filed June 10, 1959
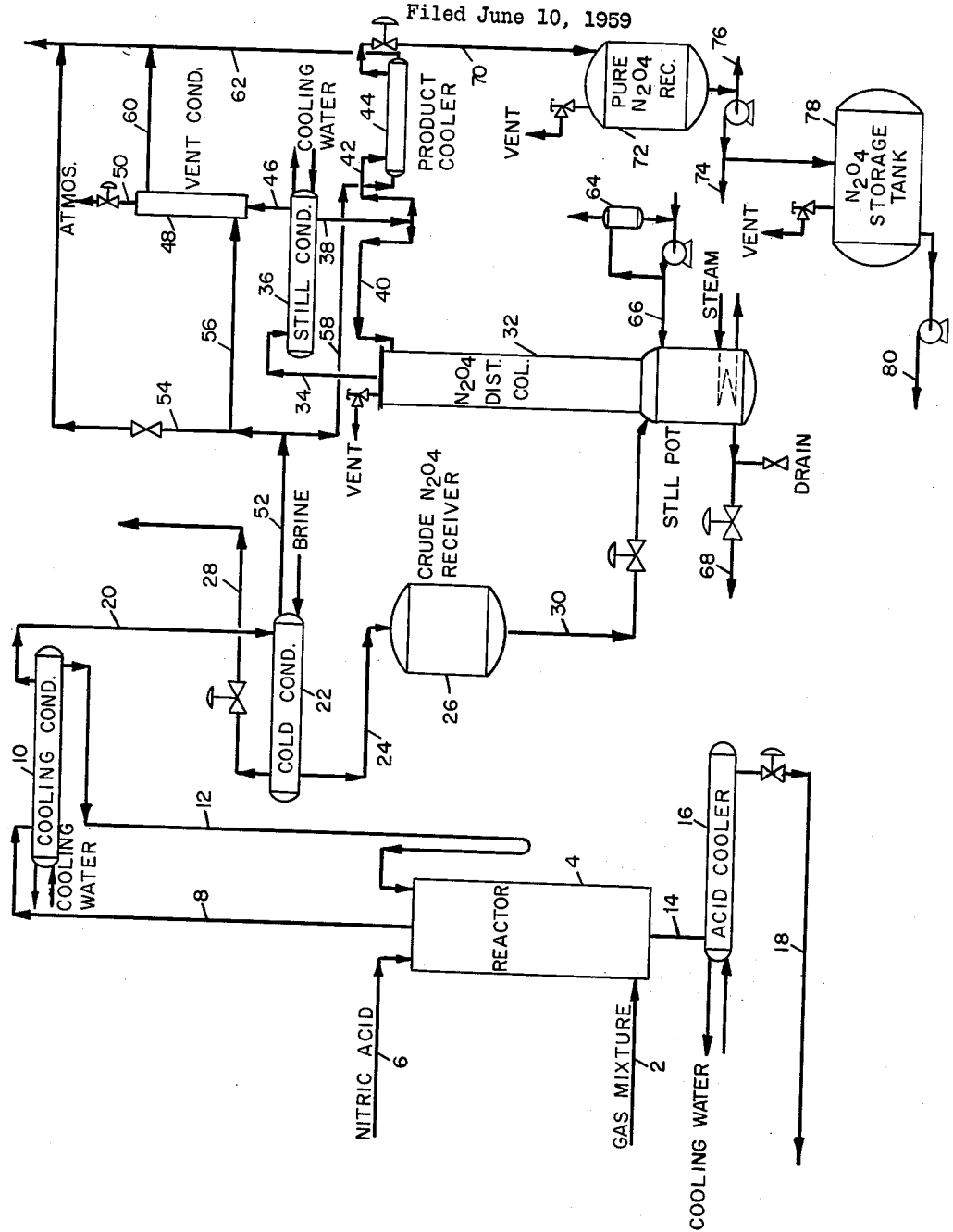
DONALD G. MORROW
INVENTOR.
BY Ernest G. Peterson
AGENT

3,063,804
MANUFACTURE OF DINITROGEN TETROXIDE
Donald G. Morrow, Wilmington, Del., assignor to Hercules Powder Company, Wilmington, Del., a corporation of Delaware
Filed June 10, 1959, Ser. No. 819,496
10 Claims. (Cl. 23—162)

This invention relates to the production of dinitrogen tetroxide and more particularly to a new and improved process for the production of dinitrogen tetroxide of high quality.

Various methods have been proposed in recent years for the manufacture of dinitrogen tetroxide in view of its utility as a powerful oxidizing agent. These methods include the thermal cracking of highly concentrated nitric acid, the absorption of $NO_2$ from ammonia oxidation units in various desiccants, and the reaction of nitric acid with sulfur. Generally, these methods have not been found particularly attractive in view of the fact that the cracking process requires special materials of construction capable of withstanding the high temperatures required while the other methods which require desiccants or sulfur thereby impose additional economic burdens on the process which, ideally, should be confined to utilization of the oxides and oxygen acids of nitrogen exclusively.

Therefore, in accordance with the present invention it has been found that high yields of high quality dinitrogen tetroxide can be obtained based upon a unique combination of processing steps which comprises passing a hot gas mixture containing nitric oxide and rapidly cooled to a temperature above its dew point into the lower portion of a reactor in countercurrent flow to relatively cool nitric acid to produce higher oxides of nitrogen, condensing the overhead product from the reactor which primarily comprises nitrogen dioxide, nitrogen, oxygen, water and nitric acid to remove substantially all the water and nitric acid as condensate, and condensing the remaining product to remove from the nitrogen and oxygen a condensate of dinitrogen tetroxide containing a small amount of nitric acid and water. Additionally, the present invention includes the step of removing the small amount of nitric acid and water from the above high quality dinitrogen tetroxide to obtain substantially pure dinitrogen tetroxide.

The invention will be illustrated in greater detail with reference to the accompanying diagrammatic drawing in which the description is an example of plant operation of the invention and the percentages given are by weight unless otherwise designated.

In the drawing, a gas mixture was passed through a conduit 2 into the bottom portion of a reactor 4. The gas mixture was obtained from an ammonia oxidation plant having a conventional converter (not shown) in which a mixture of air and ammonia gas was passed over an oxidation catalyst at temperatures of from about 900–1000° C. This converter gas was fed at approximately 200 c.f.m. at 110 p.s.i.g. and rapidly cooled to approximately 350° C. before entering conduit 2. This rapid cooling of the converter gas may be effected by a waste heat boiler (not shown) or other suitable means and should proceed as quickly as possible at a temperature above the dew point of the converter gas so that the NO present is not appreciably oxidized to $NO_2$. Thus the gas mixture fed through the conduit 2 into the reactor 4 had substantially the following composition: 11% NO, 7% $O_2$, 72% $N_2$ and 10% $H_2O$.

This gas mixture was passed continuously into the bottom portion of the reactor 4 which was a conventional packed tower type reactor. At the same time, approximately 60% nitric acid at about 25° C. was passed continuously through a conduit 6 into the upper portion of the reactor 4 and flowed downwardly through the reactor in countercurrent contact with the upward flowing gases of the gas mixture. The overhead product was passed through a conduit 8 into a water-cooled cooling condenser 10 and the condensate which was approximately 60% nitric acid at about 40° C. from the cooling condenser was refluxed continuously through a conduit 12 to the upper portion of the reactor 4. This condensate likewise flowed downwardly through the reactor 4 in countercurrent contact with the upwardly flowing gases of the gas mixture. With this system, the overhead product passed through the conduit 8 had substantially the following composition: 25% $NO_2$, 61% $N_2$, 3% $O_2$, 6% $H_2O$ and 5% $HNO_3$ (excluding unreacted NO).

This overhead product entered the cooling condenser 10 at approximately 111 c.f.m. at 105 p.s.i.g. and at a temperature which was maintained at not more than 120° C. primarily to avoid undue corrosion of equipment due to excessive temperature. It will be appreciated that the nitric oxide of the gas mixture reacts with the 60% cool nitric acids which are fed into the upper portion of the reactor. According to the reaction $NO+2HNO_3 = 3NO_2+H_2O$, it is well known that maximum conversion of NO to $NO_2$ is favored by strong acid and a high temperature. Since the available heat content of the entering gas mixture is sufficiently high in itself to maintain a suitably high reaction temperature and since the reactor is under pressure from the gas mixture source, a very efficient space-time yield of NO to $NO_2$ takes place. More explicitly, the bottoms product from the reactor 4 was passed through a conduit 14 to an acid cooler 16 and from the acid cooler through a valved conduit 18. The acid passed through the conduit 14 was approximately 50% nitric acid and was maintained at about 130° C. This 50% nitric acid from the valved conduit 18 may be sent to suitable concentration equipment and recycled as approximately 60% nitric acid or otherwise suitably utilized as by neutralization to ammonium nitrate.

Uncondensed product from the cooling condenser 10 was passed through a conduit 20 into a cold condenser 22. The cold condenser 22 was brine-cooled at a temperature of about −9° C. The uncondensed product passed through conduit 20 had substantially the following composition: 28.4% $NO_2$, 68.4% $N_2$, 2.9% $O_2$, 0.2% $H_2O$ and 0.1% $HNO_3$ (excluding reaction between $NO_2$ and $H_2O$ in the cooling condenser).

This uncondensed product entered the cold condenser 22 at approximately 73 c.f.m. at 103 p.s.i.g. and at a temperature of about 40° C. Condensate from cold condenser 22 was passed through a conduit 24 at about 100 p.s.i.g. into a crude $N_2O_4$ receiver 26. The condensate was substantially free (less than 1%) of lower oxides of nitrogen and had substantially the following composition: 98.9% $N_2O_4$, 0.7% $H_2O$ and 0.4% $HNO_3$ (excluding reaction between $NO_2$ and $H_2O$).

Uncondensed product from the cold condenser 22 was passed through a valved conduit 28 to the ammonia oxidation plant absorption tower. This uncondensed product left the cold condenser at approximately 54 c.f.m. at 100 p.s.i.g. and at a temperature of about −9° C. and had substantially the following composition: 7% $NO_2$, 89% $N_2$ and 4% $O_2$.

Although the product collected in receiver 26 has been designated "crude" $N_2O_4$, it is, nevertheless, a high quality product having utility without further purification. For example, $N_2O_4$ containing less than 2% $HNO_3$, less than 1% $H_2O$ and less than 1.0% of lower oxides of nitrogen is frequently considered of sufficient quality for use in rocket fuels and in certain chemical reactions.

Such quality specifications are easily obtainable at that stage of the process designated crude $N_2O_4$ in accordance with the present invention.

To obtain substantially pure $N_2O_4$, the crude $N_2O_4$ from receiver 26 was passed through a valved conduit 30 to the still pot of a packed distillation column 32. This column was operated at superatmospheric pressure conveniently at about 30 p.s.i.g. to facilitate condensation of the $N_2O_4$. The overhead product from the packed distillation column 32 was passed through a conduit 34 and into a water-cooled still condenser 36. $N_2O_4$ condensate from the still condenser 36 was passed through a conduit 38 and a major portion of the condensate was refluxed to the upper portion of the distillation column 32 through a conduit 40. The remaining portion of the $N_2O_4$ condensate was passed through a conduit 42 into a brine-cooled product cooler 44. Uncondensed gaseous product from the still condenser 36 was passed through a conduit 46 to a brine-cooled vent condenser 48 and gaseous product from the vent condenser 48 was passed to the atmosphere through a valved conduit 50.

With reference to the distillation purification steps, liquid product from the water-cooled condenser 36 was further cooled in product cooler 44 supplied by brine from cold condenser 22 through a conduit 52 and then through a valved conduit 54 which in turn fed a conduit 56 for the vent condenser 48. A conduit 58 for the product cooler 44 provided a return for the brine to its cooling source (not shown). Also, a conduit 60 and a conduit 62 from the vent condenser 48 and the product cooler 44, respectively, provided return for the brine to its cooling source.

With reference to operation of the distillation column 32, heat was supplied to the bottom of the column by a steam coil disposed in the still pot on the bottom of the column. The crude $N_2O_4$ containing a small amount of $H_2O$ and $HNO_3$ was fed through the conduit 30 into the still pot and the refluxed substantially pure $N_2O_4$ was fed through the conduit 40 into the top portion of the column. Highly concentrated nitric acid about 98% from an acid measuring tank 64 was intermittently fed into the still pot of the distillation column 32 through a conduit 66. The concentrated nitric acid feed was controlled to maintain an acid strength of at least 70% to prevent any $N_2O_3$ from going overhead. The bottoms product from the still pot of the distillation column 32 was intermittently removed through a valved conduit 68 and suitably returned to the reactor 4 through nitric acid feed conduit 6. These intermittent operations may, of course, be carried out continuously. The bottoms product had substantially the following composition: 50% $N_2O_4$, 5% $H_2O$, and 45% $HNO_3$. The output of the distillation column 32 as represented by the overhead $N_2O_4$ product passed to the still condenser 36 was 1950 pounds per hour at a pressure of 35 p.s.i.g. The reflux from the still condenser 36 passed back into the distillation column was 1300 pounds per hour. The remaining $N_2O_4$ product which amounted to 650 pounds per hour was passed from product cooler 44 through a valved conduit 70 into a pure $N_2O_4$ receiver 72. Thus a reflux ratio of 2:1 was utilized. However, a reflux ratio of from about 0.5:1 to about 5:1 may be utilized within the practical purview of the invention. Product from the pure $N_2O_4$ receiver 72 may be used for cylinder loading as represented by a conduit 74, or may be sent to the acid area of the plant as represented by a conduit 76, or may be passed to a $N_2O_4$ storage tank 78 for ultimate loading through a conduit 80 into suitable cylinders, tank trucks, or tank cars as desired. The pure $N_2O_4$ product of this invention is free of detectable amount of lower oxides of nitrogen and contains less than 0.1 of 1% of $H_2O$ and $HNO_3$. Accordingly, this product is suitable for use where very exacting specifications as to quality must be met in rocket fuels and in certain chemical reactions.

From the foregoing example, it is evident that there are several factors which will influence conditions for most satisfactory operation of the invention. However, this will be more readily appreciated in light of reference to certain basic factors involved in practicing the invention.

The primary product of the catalytic oxidation of ammonia is nitric oxide, which upon cooling in the presence of the excess oxygen in the gas stream reacts to produce a nitrogen dioxide or dinitrogen tetroxide according to Equation 1:

(1) 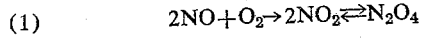
$$2NO + O_2 \rightarrow 2NO_2 \rightleftharpoons N_2O_4$$

Isolation of the latter in a pure state is not a simple procedure because it is present to the extent of only about 10% by volume (as $NO_2$) and upon cooling reacts with the water produced in the converter to form nitric acid in accordance with Equation 2:

(2) 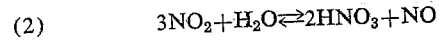
$$3NO_2 + H_2O \rightleftharpoons 2HNO_3 + NO$$

After removal of the cooler-condenser acid conventionally so formed, the $NO_2$ content of the gas stream is reduced to about 7% by volume and some quantity of lower oxides is always present. Removal of this low concentration of $NO_2$ by refrigeration or absorption is, of course, difficult and expensive and the product is of low quality.

Now in accordance with the preferred embodiment of this invention there is provided contact of partially cooled converter gas (300–500° C.), rapidly cooled to a temperature above its dew point and in which little of the NO content has been oxidized to $NO_2$, countercurrently in a packed column with approximately 60% $HNO_3$, at a resultant temperature of vapors leaving the reactor of about 90° to about 120° C. The term "dew point" as used herein means the temperature at which liquefaction of vapor begins. Under these conditions, Equation 2 above predominantly proceeds from right to left, resulting in enrichment of the gas stream in $NO_2$ content. Under ideal conditions an increase from about 10% to about 30% $NO_2$ by volume occurs. Under the practical conditions described in the example, about 17% $NO_2$ by volume was obtained. The partially stripped nitric acid from the base of the reactor may be disposed of by neutralization to ammonium nitrate or by separation into 60–68% nitrtic acid and water in a conventional fractionating column and recycling the concentrated acid to the reactor. The $NO_2$-enriched gas stream is cooled in two stages: first to about 40° C. to condense the greater part of the nitric acid and water content and a small part of the $NO_2$ content, and finally to about −9° C. (just above the freezing point of $N_2O_4$) to obtain a condensate or crude product consisting mostly of $N_2O_4$ with some nitric acid and water. From the foregoing it will be appreciated that the two-stage cooling in accordance with this invention is highly important in that it accomplishes efficient recovery of high quality dinitrogen tetroxide with a very minor amount of undesirable compounds.

With reference to the example, it will be noted that the crude $N_2O_4$ was practically free of $N_2O_3$ as a result of precise optimum control of the process. However, in instances where a deleterious amount of $N_2O_3$ is carried into the crude product as induced by control variables particularly in large scale plant operation, the $N_2O_3$ may be removed in the distillation column. Thus, the first condensate is returned to the reactor while the second condensate is distilled in the distillation column to produce pure (99+%) $N_2O_4$ overhead with residual $N_2O_4$, $H_2O$ and $HNO_3$ as the bottoms product. If $N_2O_3$ is present in the crude product, it is eliminated by scrubbing the vapors in the distillation column with strong nitric acid. Under the conditions set forth, 75% or more of the $NO_2$ content of the enriched gas may be recovered as liquid $N_2O_4$.

The reactor and the distillation column utilized in the example of this invention were packed with corrosionresistant Raschig rings and optimum performance was attained when the reactor and distillation column were operated with film flow rather than flooded. However, plate designs may be utilized in lieu of packing and, of course, constructed of suitable chemical-resistant material. The pressure utilized for the original gas mixture feed was that ordinarily delivered from a converted gas system. Consequently, the initial partial cooling of the converter gas and the temperatures employed and pressure drop throughout the system were correlated to attain greatest overall economy and efficiency of the process. For example, the cooling condenser under the prevailing pressure was water-cooled and less stringent requirements for cooling were placed on the cold condenser which was brine-cooled. Generally, however, a pressure of from about 50 to about 150 p.s.i.g. (pounds per square inch gage) and a temperature from about 300° to about 500° C. may be utilized for the gas mixture fed into the reactor with subsequent processing equipment and conditions correlated thereto to obtain the desired stripped products and condensates without appreciably departing from the overall efficiency and economy of the process. To this end, however, it has been found that substantially optimum operating conditions are attained when the $HNO_3$ is fed into the reactor at a temperature from about 0° to about 100° C. and at about 60 to about 70% concentration, and when the free space in the reactor below the acid-gas contact zone is held to a minimum.

Additionally, it will be appreciated that a modified ammonia-air mixture may be employed in connection with the converter gas mixture fed into the reactor in order to make the maximum amount of NO available. The usual ammonia-air mixture contains about 10.3 mole percent $NH_3$-air to the converter. In conjunction with the example of this invention, 10.3 mole percent $NH_3$-air was utilized and gave approximately 98% conversion to NO. At appreciable low oxygen levels the conversions drop to uneconomically low levels. However, the $NH_3$-oxygen ratio may be increased by the introduction of inert gas such as $CO_2$, $N_2$, $H_2O$ to replace part of the air in the converter mixture, and such is contemplated as within the purview of the invention.

From the foregoing, it will be apparent to those skilled in the art that the system shown and described was designed primarily for operation in conjunction with an ammonia oxidation plant. However, it will be appreciated that the invention is not to be construed as so limited and actually may be carried out by the use of varous modifications and changes without departing from its spirit and scope with only such limitations placed thereon as are imposed by the appended claims.

What I claim and desire to protect by Letters Patent is:

1. A method for the manufacture of dinitrogen tetroxide which comprises in combination the following steps: passing a hot gas mixture containing nitric oxide and rapidly cooled to a temperature above its dew point into the lower portion of a reactor at superatmospheric pressure and in countercurrent flow to cool nitric acid of from about 60 to about 70% concentration when introduced into the upper portion of the reactor to produce higher oxides of nitrogen according to the equation $$NO + 2HNO_3 \rightarrow 3NO_2 + H_2O$$

condensing the overhead product from the reactor which primarily comprises nitrogen dioxide, nitrogen, oxygen, water and nitric acid to remove substantially all the water and nitric acid as condensate, and condensing the remaining product to remove from the nitrogen and oxygen a condensate of dinitrogen tetroxide containing a small amount of nitric acid and water.

2. A method for the manufacture of dinitrogen tetroxide which comprises in combination the following steps: passing a hot gas mixture containing nitric oxide and rapidly cooled to a temperature above its dew point into the lower portion of a reactor at superatmospheric pressure and in countercurrent flow to cool nitric acid of from about 60 to about 70% concentration when introduced into the upper portion of the reactor to produce higher oxides of nitrogen according to the equation $$NO + 2HNO_3 \rightarrow 3NO_2 + H_2O$$

condensing the overhead product from the reactor which primarily comprises nitrogen dioxide, nitrogen, oxygen, water and nitric acid to remove substantially all the water and nitric acid as condensate, condensing the remaining product to remove from the nitrogen and oxygen a condensate of dinitrogen tetroxide containing a small amount of nitric acid and water, and separating the small amount of nitric acid and water from the dinitrogen tetroxide to obtain substantially pure dinitrogen tetroxide.

3. A method for the manufacture of dinitrogen tetroxide which comprises in combination the following steps: oxidizing ammonia with air to produce a gas mixture containing nitric oxide, rapidly cooling the gas mixture to a temperature above its dew point and passing it into the lower portion of a reactor at superatmospheric pressure, passing cool nitric acid of from about 60 to about 70% concentration when introduced into the upper portion of the reactor in countercurrent flow to the gas mixture to produce higher oxides of nitrogen according to the equation $NO + 2HNO_3 \rightarrow 3NO_2 + H_2O$, condensing the overhead product from the reactor which primarily comprises nitrogen dioxide, nitrogen, oxygen, nitric acid and water to remove substantially all the nitric acid and water, and condensing the remaining product to remove from the nitrogen and oxygen a condensate of dinitrogen tetroxide containing a small amount of nitric acid and water.

4. A method for the manufacture of dinitrogen tetroxide which comprises in combination the following steps: oxidizing ammonia with air to produce a gas mixture containing nitric oxide, rapidly cooling the gas mixture to a temperature above its dew point and passing it into the lower portion of a reactor at superatmospheric pressure, passing cool nitric acid of from about 60 to about 70% concentration when introduced into the upper portion of the reactor in countercurrent flow to the gas mixture to produce higher oxides of nitrogen according to the equation $NO + 2HNO_3 \rightarrow 3NO_2 + H_2O$, condensing the overhead product from the reactor which primarily comprises nitrogen dioxide, nitrogen, oxygen, nitric acid and water to remove substantially all the nitric acid and water, condensing the remaining product to remove from the nitrogen and oxygen a condensate of dinitrogen tetroxide containing a small amount of nitric acid and water, and separating the small amount of nitric acid and water from the dinitrogen tetroxide to obtain substantially pure dinitrogen tetroxide.

5. A method for the manufacture of dinitrogen tetroxide which comprises in combination the following steps: oxidizing ammonia with air to produce a gas mixture containing nitric oxide, rapidly cooling the gas mixture to a temperature above its dew point and passing it into the lower portion of a reactor at superatmospheric pressure, passing cool nitric acid of from about 60 to about 70% concentration when introduced into the upper portion of the reactor in countercurrent flow to the gas mixture to produce higher oxides of nitrogen according to the equation $NO + 2HNO_3 \rightarrow 3NO_2 + H_2O$, passing the overhead product primarily comprising nitrogen dioxide, nitrogen, oxygen, nitric acid and water from the reactor to a first condenser to remove substantially all the nitric acid and water, passing the remaining product to a second condenser to remove from the nitrogen and oxygen a condensate of crude dinitrogen tetroxide containing a small amount of nitric acid and water, and separating the small amount of nitric acid and water from the crude dinitrogen tetroxide to obtain substantially pure dinitrogen tetroxide.

6. A method for the manufacture of dinitrogen tetroxide which comprises in combination the following steps:

oxidizing ammonia with air to produce a gas mixture containing nitric oxide, rapidly cooling the gas mixture to a temperature above its dew point and passing it into the lower portion of a reactor at superatmospheric pressure, passing cool nitric acid of from about 60 to about 70% concentration when introduced into the upper portion of the reactor in countercurrent flow to the gas mixture to produce higher oxides of nitrogen according to the equation $NO+2HNO_3 \rightarrow 3NO_2+H_2O$, passing the overhead product primarily comprising nitrogen dioxide, nitrogen, oxygen, nitric acid and water from the reactor to a first condenser to remove substantially all the nitric acid and water and refluxing said nitric acid and water to the upper portion of the reactor, passing the remaining product to a second condenser to remove from the nitrogen and oxygen a condensate of crude dinitrogen tetroxide containing a small amount of nitric acid and water, and separating the small amount of nitric acid and water from the crude dinitrogen tetroxide by distillation followed by condensation and cooling to obtain substantially pure dinitrogen tetroxide.

7. A method for the manufacture of dinitrogen tetroxide which comprises in combination the following steps: oxidizing ammonia with air to produce a gas mixture containing nitric oxide, rapidly cooling the gas mixture to a temperature above its dew point and passing it into the lower portion of a reactor at superatmospheric pressure, passing cool nitric acid of from about 60 to about 70% concentration when introduced into the upper portion of the reactor in countercurrent flow to the gas mixture to produce higher oxides of nitrogen according to the equation $NO+2HNO_3 \rightarrow 3NO_2+H_2O$, passing the overhead product primarily comprising nitrogen dioxide, nitrogen, oxygen, nitric acid and water from the reactor to a first condenser to remove substantially all the nitric acid and water and refluxing said nitric acid and water to the upper portion of the reactor, passing the remaining product to a second condenser to remove from the nitrogen and oxygen a condensate of crude dinitrogen tetroxide containing a small amount of nitric acid and water, passing the crude dinitrogen tetroxide into the lower portion of a distillation column to remove the small amount of nitric acid and water, passing the overhead product from the distillation column to a third condenser, refluxing a portion of the condensate from the third condenser to the upper portion of said distillation column in countercurrent flow to the crude dinitrogen tetroxide, and cooling and collecting the remaining portion of the condensate as substantially pure dinitrogen tetroxide.

8. A method for the manufacture of dinitrogen tetroxide which comprises in combination the following steps: oxidizing ammonia with air to produce a gas mixture containing nitric oxide, partially cooling the gas mixture to a temperature from about 300 to about 500° C. and passing it into the lower portion of a reactor at a pressure of from about 50 to about 150 pounds per square inch gage, passing nitric acid of from about 60 to about 70% concentration when introduced into the upper portion of the reactor at a temperature from about 0° to about 100° C. in countercurrent flow to the gas mixture to produce higher oxides of nitrogen according to the equation $NO+2HNO_3 \rightarrow 3NO_2+H_2O$, passing the overhead product primarily comprising nitrogen dioxide, nitrogen, oxygen, nitric acid and water from the reactor at a temperature of not more than 120° C. to a first condenser to remove substantially all the nitric acid and water, and passing the remaining product at a temperature from about 25° to about 50° C. to a second condenser to remove from the nitrogen and oxygen a condensate of crude dinitrogen tetroxide containing a small amount of nitric acid and water.

9. A method for the manufacture of dinitrogen tetroxide which comprises in combination the following steps: oxidizing ammonia with air to produce a gas mixture containing nitric oxide, partially cooling the gas mixture to a temperature from about 300° to about 500° C. and passing it into the lower portion of a reactor at a pressure of from about 50 to about 150 pounds per square inch gage, passing nitric acid of from about 60 to about 70% concentration when introduced into the upper portion of the reactor at a temperature from about 0° to about 100° C. in countercurrent flow to the gas mixture to produce higher oxides of nitrogen according to the equation $NO+2HNO_3 \rightarrow 3NO_2+H_2O$, passing the overhead product primarily comprising nitrogen dioxide, nitrogen, oxygen, nitric acid and water from the reactor at a temperature of not more than 120° C. to a first condenser to remove substantially all the nitric acid and water, passing the remaining product at a temperature from about 25° to about 50° C. to a second condenser to remove from the nitrogen and oxygen a condensate of crude dinitrogen tetroxide containing a small amount of nitric acid and water, and separating the small amount of nitric acid and water from the crude dinitrogen tetroxide by distillation followed by condensation and cooling to obtain substantially pure dinitrogen tetroxide.

10. A method for the manufacture of dinitrogen tetroxide which comprises in combination the following steps: oxidizing ammonia with air to produce a gas mixture containing nitric oxide, partially cooling the gas mixture to a temperature from about 300° to about 500° C. and passing it into the lower portion of a reactor at a pressure of from about 50 to about 150 pounds per square inch gage, passing nitric acid of from about 60 to about 70% concentration when introduced into the upper portion of the reactor at a temperature from about 0° to about 100° C. in countercurrent flow to the gas mixture to produce higher oxides of nitrogen according to the equation $NO+2HNO_3 \rightarrow 3NO_2+H_2O$, passing the overhead product primarily comprising nitrogen dioxide, nitrogen, oxygen, nitric acid and water from the reactor at a temperature of not more than 120° C. to a first condenser to remove substantially all the nitric acid and water, passing the the remaining product at a temperature from about 25° to about 50° C. to a second condenser to remove from the nitrogen and oxygen a condensate of crude dinitrogen tetroxide containing a small amount of nitric acid and water, passing the crude dinitrogen tetroxide into the lower portion of a distillation column to remove the small amount of nitric acid and water, passing the overhead product from the distillation column to a third condenser, refluxing a portion of the condensate from the third condenser to the upper portion of said distillation column in countercurrent flow to the crude dinitrogen tetroxide, and cooling and collecting the remaining portion of the condensate as substantially pure dinitrogen tetroxide.

References Cited in the file of this patent

UNITED STATES PATENTS

| | | |
|---|---|---|
| 1,872,638 | Hechenbleikner | Aug. 16, 1932 |
| 1,901,816 | Luscher | Mar. 14, 1953 |
| 1,989,267 | Caro | Jan. 29, 1935 |
| 2,098,953 | Christenson | Nov. 16, 1937 |
| 2,725,280 | Yodis | Nov. 29, 1955 |
| 2,761,761 | Congdon | Sept. 4, 1956 |